(12) United States Patent
Goran et al.

(10) Patent No.: US 11,665,441 B2
(45) Date of Patent: May 30, 2023

(54) DETECTOR, METHODS FOR OPERATING A DETECTOR AND DETECTOR PIXEL CIRCUIT

(71) Applicant: BRUKER NANO GMBH, Berlin (DE)

(72) Inventors: Daniel Radu Goran, Berlin (DE); Luca Bombelli, Milan (IT); Paolo Trigilio, Gorgonzola Milan (IT)

(73) Assignee: BRUKER NANO GMBH, Berlin (DE)

( * ) Notice: Subject to any disclaimer, the term of this patent is extended or adjusted under 35 U.S.C. 154(b) by 180 days.

(21) Appl. No.: 17/260,087

(22) PCT Filed: Jul. 19, 2019

(86) PCT No.: PCT/EP2019/069464
§ 371 (c)(1),
(2) Date: Jan. 13, 2021

(87) PCT Pub. No.: WO2020/025353
PCT Pub. Date: Feb. 6, 2020

(65) Prior Publication Data
US 2021/0314503 A1 Oct. 7, 2021

(30) Foreign Application Priority Data
Aug. 2, 2018 (EP) ..................................... 18187018

(51) Int. Cl.
*G01J 1/46* (2006.01)
*H04N 25/42* (2023.01)
(Continued)

(52) U.S. Cl.
CPC ................. *H04N 25/42* (2023.01); *G01J 1/46* (2013.01); *H04N 25/75* (2023.01); *G01J 2001/446* (2013.01)

(58) Field of Classification Search
CPC . H04N 5/343; H04N 5/378; G01J 1/46; G01J 2001/446
See application file for complete search history.

(56) References Cited

U.S. PATENT DOCUMENTS

| 6,593,562 B1 | 7/2003 | Parrish et al. |
| 10,638,066 B2 * | 4/2020 | Kobayashi ......... H04N 5/35554 |

(Continued)

OTHER PUBLICATIONS

International Search Report dated Jan. 2, 2020, in connection with PCT International Application No. PCT/EP2019/069464.

(Continued)

*Primary Examiner* — Tony Ko
(74) *Attorney, Agent, or Firm* — Norris McLaughlin, P.A.

(57) ABSTRACT

A pixelated sensor comprises a semiconductor substrate chip with a plurality of sensor pixels and a detector chip with a plurality of detector pixels. Each of the sensor pixels is configured as a photodiode and is electrically connected to an input node of one of the detector pixels. The detector pixels are further configured to convert and output the sensor input to an analog to digital converter. The detector chip further comprises first and second macropixels and a plurality of second macropixels, wherein each first macropixel is formed by subset of detector pixels switchably interconnected via a first conducting grid and wherein each second macropixel is formed by a subset of first macropixels switchably interconnected via a second conducting grid.

10 Claims, 8 Drawing Sheets

(51) Int. Cl.
*H04N 25/75* (2023.01)
*G01J 1/44* (2006.01)

(56) References Cited

U.S. PATENT DOCUMENTS

| | | |
|---|---|---|
| 2002/0191828 A1 | 12/2002 | Colbeth et al. |
| 2007/0120062 A1 | 5/2007 | Li et al. |
| 2009/0080601 A1 | 3/2009 | Tkaczyk et al. |
| 2014/0027606 A1 | 1/2014 | Raynor et al. |
| 2014/0232841 A1 | 8/2014 | Ohta et al. |
| 2017/0212253 A1 | 7/2017 | Fu et al. |
| 2018/0196149 A1 | 7/2018 | Blevis et al. |

OTHER PUBLICATIONS

Written Opinion issued in connection with PCT International Application No. PCT/EP2019/069464.
Extended European Search Report dated Apr. 30, 2019, in connection with Application No. 18187018.9.
Partial Search Report dated Sep. 30, 2019, in connection with PCT International Application No. PCT/EP2019/069464.

* cited by examiner

DETECTOR, METHODS FOR OPERATING A DETECTOR AND DETECTOR PIXEL CIRCUIT

This application is the U.S. National Stage of International Application No. PCT/EP2019/069464, filed Jul. 19, 2019, which claims foreign priority benefit under 35 U.S.C. § 119 of European Application No. 18187018.9, filed Aug. 2, 2018.

FIELD OF THE INVENTION

The present invention relates to a pixelated detector, particularly to an integrated CMOS sensor suitable to be used for Electron BackScatter Diffraction (EBSD) and Transmission Kikuchi Diffraction (TKD) measurements. The present invention further relates to methods for operating such a pixelated detector, particularly to methods providing a fast readout method additional to a conventional imaging mode. The present invention further relates to a detector pixel circuit for a pixelated detector according to the present invention.

TECHNOLOGICAL BACKGROUND

Solid state image sensors are widely applied with possible applications ranging from user devices, such as digital cameras and smartphones, to professional detectors used e.g. in X-ray analysis or electron microscopes. While charged-coupled devices, CCD, have been predominantly used in the beginning of solid state imaging, CMOS detectors have gained significance, particularly due to their capability to provide system-on-chip, SOC, functionality. Therein, the detection circuitry is provided on the same chip as the light sensitive substrate, wherein the light sensitive substrate, usually silicon-based, converts light into electric charges and the detection circuitry further processes these electric charges into electronic signals.

A common CMOS image sensor comprises a two-dimensional array of sensor pixels and peripheral circuits. Each of the pixels is configured to convert a part of an image into electric signals, wherein a scanning mechanism is applied to process the signals of the pixels.

Particularly, the pixels are arranged in an array of columns and rows such that each pixel can be addressed by row and column combination. Usually, a row of sensor pixels to be read out is selected via a row decoder, wherein each pixel of the row outputs a sensor signal via a column bus that is shared by all pixels of the column to reduce the amount of required wiring.

The pixels of a CMOS image sensor are usually categorized into three types, namely passive pixel sensors (PPS), digital pixel sensors (DPS) and active pixel sensors (APS). A passive pixel merely comprises a photodiode connected to an integration node and a select transistor connecting the pixel to a column bus. Thus, a small pixel size with high fill factor can be realized. A digital pixel further comprises an analog-to-digital-converter disposed on pixel level and has a better signal to noise ratio at the cost of a decreased fill factor. In an active pixel sensor, the sensor signal is amplified at pixel level without digitization, thus increasing image quality with a lower impact on the fill factor and thus the pixel size of the image sensor.

Pixelated CMOS image sensors are also utilized in electron microscopes in order to perform forescatter and backscatter electron imaging. In electron backscatter diffraction (EBSD) a crystalline sample is placed in a scanning electron microscope (SEM) and irradiated with a focused electron beam. Electrons are scattered within the sample and a certain part of them will scatter out of the sample, i.e. backscattering. A small fraction of the backscattered electrons, i.e. diffracted ones, will have an angle-dependent intensity distribution and will create a so called Kikuchi pattern when projected on a flat detection surface, e.g. photographic film, phosphor screen or direct electron detection sensor. Using a two-dimensional CMOS detector, Kikuchi patterns can be recorded on the detector surface. Similarly, Kikuchi patterns formed by scattered electrons passing through an electron transparent sample can be collected by placing a detection surface underneath the sample. This technique is known as Transmission Kikuchi Diffraction and is used in both Transmission Electron Microscopes as well as Scanning Electron Microscopes.

Crystal orientation mapping by the means of EBSD or TKD technique is done by placing the electron beam on a grid of points and acquire Kikuchi patterns from each of these points. The patterns are then transferred to a computer and subsequently analyzed by automatic routines. The pattern acquisition procedure requires the beam to be static in each point on the grid for exposure times that can vary from a few hundreds of µs to a few seconds thus making the mapping procedure quite time consuming. For comparison purposes, normal imaging is done at speeds that can be more than two orders of magnitude faster than the fastest mapping, i.e. 1-2 µs vs. 200-300 µs per point. For this reason, most EBSD detectors have been designed to allow obtaining preliminary images before starting orientation mapping. In order to allow for a fast acquisition of such preliminary images dedicated diodes located in the proximity of the detection surface are usually utilized. However, these diodes inevitably require a dedicated field of view which may not be ideal as well as additional mechanics and readout electronics.

It is thus an object of the present invention to overcome or reduce the disadvantages of the prior art and to provide a pixelated sensor that has a built-in capability for such preliminary imaging mode.

DESCRIPTION OF THE INVENTION

The disadvantages of the prior art are overcome or at least reduced by the subject-matter of the independent claims. Preferred embodiments are subject of the dependent claims.

A first aspect of the present invention relates to a pixelated sensor that comprises a semiconductor substrate chip with a plurality of sensor pixels and a detector chip with a plurality of detector pixels. Each sensor pixel of the plurality of sensor pixels is configured as a photodiode, for converting incident radiation, particularly incident electrons such as backscattered electrons, into electrical charges. In the context of this disclosure, each sensor pixel is further configured to output these charges as a sensor signal. Each of the plurality of sensor pixels is electrically connected to an input node of one of the detector pixels.

Preferably, for each sensor pixel of the semiconductor substrate chip there is exactly one detector pixel of the detector chip. Further preferred, the detector chip is bump bonded to the semiconductor substrate chip, however other electrical connections, such as e.g. wire-bonding, can also be used.

Each of the detector pixels of the detector chip is configured to receive a sensor input from the sensor pixel that is electrically connected to the respective detector pixel. Further, each of the detector pixels is configured to convert the sensor input, i.e. the electrical charges output by the sensor pixel, into a detector output. Therein, in principle the detector output can be one of a voltage output or a current output depending on the specific detector pixel type. Further, each detector pixel is configured to output the detector output to an analog to digital converter, ADC. As mentioned above and described in detail with respect to the specific embodiments, one ADC per detector chip, per column or per detector pixel can be used.

According to the present invention, the detector chip further comprises a plurality of macropixels as a selectable (selectably) hardwired structure on the detector chip. Therein, each macropixel is formed by a subset of detector pixels that are interconnected by at least one conducting grid. The conducting grid preferably is part of the detector chip. However, constructions are possible, wherein at least parts of the conducting grid might be considered to be part of the sensor chip. Each detector pixel of the subset of detector pixels interconnected by the conducting grid is configured to be switchable connected to the at least one conducting grid. Each of the detector pixels can be either electrically connected to the respective conducting grid or electrically disconnected from the respective conducting grid.

The connecting and disconnecting of a detector pixel and a conducting grid is preferably controlled by at least one control signal. Further preferred, the detector pixels are configured to be individually connected and or disconnected to the conducting grid. Alternatively, the subset of detector pixels is configured to be commonly connected and disconnected to and from the respective conducting grid or subunits of the subset of detector pixels are configured to be commonly connected and disconnected to and from the respective conducting grid. Exemplarily, a subset of detector pixels may be constituted by a plurality of subunits of detector pixels, each being commonly connected or disconnected to a conducting grid.

In other words, by switchable (switchably) connecting a subset of detector pixels to a respective conducting grid, the subset of detector pixels can be short circuited to create a macropixel. These hardware macropixels have a larger size than individual detector pixels and thus receive larger quantities of an incident radiation, particularly of incident electrons such as backscattered electrons, than the individual detector pixels within a given time. Due to this increased sensitive area, useful image signals can be obtained via the macropixels in less time than with the individual detector pixels. Thus, hardware binning a plurality of subsets of detector pixels by interconnecting them via respective conductive grids across the pixelated sensor a fast readout mode can be realized with the pixelated detector. Preferably, each of the detector pixels is assigned to one of a plurality of macropixels.

Further, by disconnecting the detector pixels of the detector chip from the respective conducting grids, i.e. by operating each of the detector pixels individually, the detector chip can be utilized in a conventional manner thus allowing for an imaging mode with the full spatial resolution of the detector chip. Hence, the pixelated sensor of the invention provides two different imaging modes, a fast readout mode and a conventional imaging mode.

According to a preferred embodiment of the pixelated sensor, each detector pixel of the at least one macropixel is further configured to be switchable connected to the respective sensor pixel. In other words, each of the detector pixels can be either electrically connected or disconnected from the respective sensor pixel. Setting a connection between the detector pixel and the sensor pixel either conductive or non-conductive preferably occurs in response to at least one control signal. Particularly preferred, the conductivity of each of the connections between a single detector pixel and a single sensor chip can be set individually. Also preferred, at least some of these connections can be set individually, while other detector pixels are commonly connected or disconnected to their respective sensor pixels.

Further preferred, one detector pixel per macropixel can be individually connected or disconnected to its respective sensor pixel, while the remaining detector pixels of the macropixel are commonly connected or disconnected to their respective sensor pixels. Alternatively, one detector pixel per macropixel always remains connected to its respective sensor pixel, while the remaining detector pixels of the macropixel are commonly connected or disconnected to their respective sensor pixels. This preferred embodiment advantageously allows disconnecting all except one detector pixels from the sensor pixels of a macropixel, as only one detector pixel is required for processing the image signal of the macropixel. Further, by utilizing solely one detector pixel per macropixel, it is guaranteed that this detector pixel receives the electric charges from all sensor pixels of the macropixel, thus receiving a manifold of the electric charges of a single sensor pixel, thus enabling the fast readout mode without sacrificing the signal to noise ratio (SNR).

According to a particularly preferred embodiment, each of the plurality of detector pixels of the detector chip is configured to receive the sensor input via a first line comprising a first switch. In other words, each of the detector chips is electrically connected to the respective sensor chip via a respective first line as a conductive connection. A first switch is disposed in each of these conductive connections for either opening (disconnecting) or closing (connecting) the conductive connection between the sensor chip and the detector chip. As described above, preferably one first switch per macropixel is individually controlled or continuously set conductive (e.g. without comprising a first switch) and the switching states of the remaining first switches are controlled either individually or commonly. Further preferred, the conducting grid of at least one macropixel, particularly preferred of each macropixel, is switchable connected to the first lines of the respective subset of detector pixels.

According to this preferred embodiment, the first lines advantageously allow for connecting and disconnecting the detector pixels from the sensor pixels as well as for connecting and disconnecting the detector pixels from a conducting grid for forming a macropixel and thus provide an ideal structure for implementing the functionalities of the pixelated sensor of the invention. Particularly preferred, each first line of a macropixel, i.e. of a subset of detector pixels, is connected to the respective conducting grid via a respective second switch in between the respective first switch and sensor pixel. In other words, the conducting grid is connected to each of the first lines in between the respective first switch and sensor pixel. wherein the conductivity of this connection can be set via the respective second switch. Each of the first switches may be disposed either in the first line or the respective conducting grid. Further preferred, each of the detector pixels comprises an integrator stage that is configured for receiving the sensor input, i.e. the electrical charges output from the sensor pixel. Further preferred, the integrator stage is configured for integrating the sensor input for an adjustable integration time, i.e. for collecting the charges output from the sensor pixel during a set integration time period. Particularly preferred, the integrator stage is configured as a Miller integrator. Further preferred, each of the detector pixels comprises a sample and hold, SH, stage that is configured for sampling and holding a voltage outputted by the integrator stage. In other words, the SH stage is configured to receive or read out the voltage at an output of the integrator stage at a given time point and to provide this voltage constantly for a set hold time period to an output of the SH stage. In other words, the detector pixel is an active pixel.

According to a further preferred embodiment that is realized in the pixelated sensor additionally or alternatively with the first lines as described above, the SH stage of each detector pixel of the at least one macropixel, i.e. each of the respective subset of detector pixels, is configured to be switchable connected to a conducting grid. In other words, the hardware connection of the detector pixels for creating a macropixel is realized by connecting each of the detector pixels of the macropixel via their respective SH stage to the conducting grid. Therein, each of the SH stages is preferably connected to the conducting grid via a respective third switch. Further preferred, the SH stages of the detector pixels of each macropixel are respectively connected to a respective conducting grid via respective third switches. If this embodiment is realized alternatively to an embodiment with first lines as described above, it advantageously allows to prevent the built up of a capacitive load at the detector pixel input due to the conducting grid connected to the first lines. If this embodiment is realized additionally to an embodiment with first lines as described above, it advantageously allows for further averaging the detector outputs of multiple macropixels, each macropixel being connected to a conducting grid via at least one respective SH stage.

According to a further preferred embodiment, the conducting grid connected to the first lines as described above is realized additionally to a conducting grid connected to the SH stages as described above. According to this preferred embodiment, a plurality of first macropixels is formed by a first plurality of subsets of detector pixels and a plurality of second macropixels is formed by a second plurality of subsets of detector pixels. Therein, each subset of the first plurality of subsets is switchable connected to a respective first conducting grid. Further, each detector pixel of such respective first subset is switchable connected to the respective first conducting grid via its first line as described above. Also, each subset of the second plurality of subsets is switchable connected to a respective second conducting grid. Therein, each detector pixel of such respective second subset is switchable connected to the respective second conducting grid via its SH stage as described above. According to this embodiment, each second macropixel comprises one detector pixel per each of a plurality of first macropixels. In other words, each second subset of detector pixels comprises one detector pixel per each of a plurality of first subsets of detector pixels. In other words, the second macropixels are formed by interconnecting a plurality of first macropixels by interconnecting multiple detector pixels, each being part of one of the plurality of first macropixels. This preferred embodiment advantageously allows for averaging the detector outputs of multiple first macropixels, wherein each plurality of first macropixels forms a second macropixel.

Further preferred, the sensor pixels are arranged in an array of M rows and N columns and the detector chips are arranged in a corresponding array of M rows and N columns. Preferably. N equals 50 and M equals 50 and particularly preferred M equals 81 and N equals 81. Further preferred, each macropixel comprises at least 3 rows and 3 columns of detector pixels, particularly preferred each macropixel comprises at least 5 rows and 5 columns of detector pixels and further preferred each macropixel comprises at least 9 rows and 9 columns of detector pixels. According to these embodiments, the area of the macropixel amounts to 9 times, 25 times, or 81 times the area of a single detector pixel and thus receives a same manifold of incident light compared to a single detector pixel. Thus, the same signal strength can be output by the macropixel in 1/9th, 1/25th, or 1/81th of the exposure time compared to a single detector pixel and hence a fast readout mode is realized that is up to 81 times faster but with similar SNR per pixel as with the SNR produced in the normal imaging mode. Exemplarily, if the pixelated detector can be operated with 3000 frames per second, fps, during a normal imaging mode, wherein each of the detector pixels is read out individually, the pixelated detector can realize a rate up to 250000 fps in a fast read out mode, wherein macropixels constituted of 9 rows and 9 columns of detector pixels are read out individually.

According to a further preferred embodiment, the pixelated detector comprises a control unit for switchably connecting, i.e. either electrically connecting or disconnecting, the subsets of detector pixels to a respective conducting grid. Particularly preferred, the control unit is configured to switchably set the first switch, the second switch and the third switch, respectively, either conductive or non-conductive. The control unit is thus configured to realize the different operation modes of the pixelated detector, particularly a conventional imaging mode and a fast read out mode as described above. Particularly preferred, the control unit is configured to set non-conductive all second switches and/or third switches and to set conductive all first switches during the conventional imaging mode. Further preferred, the control unit is configured to set conductive all third switches and/or to set conductive all second switches and to set conductive one first switch per macropixel and non-conducting all remaining first switches during the fast read out mode. The control unit may form a part of the pixelated detector or may be disposed separately to the pixelated detector.

Another aspect of the present invention relates to a detector pixel circuit for a detector chip of a pixelated detector. Preferably, the detector pixel circuit is configured to be utilized in a detector chip that is suitable to be electrically connected, preferably bump-bonded or wire-bonded to a semiconductor substrate chip with a plurality of sensor pixels. Further preferred, each of the plurality of sensor pixels is configured as a photodiode and is configured to be electrically connected to an input node of one of a plurality of detector pixels of the detector chip. Therein each detector pixel comprises a detector pixel circuit according to the invention.

The detector pixel circuit of the present invention comprises an input node that is configured to receive a sensor signal. Preferably, the input node is configured to be connected to a sensor pixel of the semiconductor substrate chip of the pixelated detector, e.g. via wire or bump bonding. The detector pixel circuit further comprises an integrator stage that is configured for receiving the sensor input via the input node and for integrating the received sensor input. In other words, the integrator stage is configured for accumulating (integrating/collecting) the sensor signal, i.e. the electric charges output by a respective sensor pixel. received via the input node during a predetermined period of time. Particularly preferred, the integrator stage is configured as a Miller integrator.

The detector pixel circuit further comprises a sample and hold, SH, stage that is configured for sampling and holding a voltage outputted by the integrator stage. In other words, the SH stage is configured to receive a voltage output by the integrator stage at a given time point and to provide this voltage constantly for a set hold time period to an output of the SH stage. The detector pixel circuit further comprises an output node that is configured for receiving a detector output from the SH stage. Preferably the output node is connectable to an ADC.

The detector pixel circuit of the present invention further comprises at least one of a grid node that is switchable connected to the input node via a grid switch and a grid node that is switchable connected to the SH stage via a grid switch. In other words, the detector pixel circuit comprises at least one further conducting line that can be connected by a grid switch to the input node or the SH stage of the detector pixel circuit and that is further configured to be connected to another detector pixel circuit, preferably to the grid node of another detector pixel circuit. The grid node thus allows for interconnecting a plurality of detector pixel circuits according to the present invention to each other directly or via an additional conductive grid. In other words, the interconnected grid nodes of multiple detector pixel circuits may form a conductive grid themselves or each grid node is connectable to a separate conductive grid.

The detector pixel circuit of the present invention can advantageously be operated in a conventional imaging mode, if the grid switch is set non-conductive. If the grid switch is set conductive, a plurality of detector pixel circuits is interconnected thus forming a macropixel. The macropixel receives the electric charges output by the plurality of sensor pixels corresponding to the interconnected detector pixels and can thus provide a sufficient signal-to-noise ratio in a significantly decreased time compared to a single detector pixel circuit. In other words, the detector pixel circuit of the invention allows for hardware-binning multiple pixels of a pixelated detector on detector chip level and thus enables a fast read out mode that can be utilized for obtaining preliminary images in order to determine a ROI of a sample.

According to a preferred embodiment, the detector pixel circuit comprises a first line that is electrically interconnecting the input node and the integrator stage and a first switch that is disposed in the first line between the input node and the integrator stage. In other words, the integrator stage is switchable connected to the input node via the first line, wherein the switching between a conductive and non-conductive state is provided by the first switch. According to this preferred embodiment, a first grid node branches from the first line in between the first switch and the input node via a first grid switch. In other words, the first grid node can be either electrically connected or disconnected from the first line depending on a switching state of the first grid switch that is disposed in the first line or the first grid node. This preferred embodiment advantageously provides a simple implementation of the circuit.

According to a further preferred embodiment that is realized additionally or alternatively to the embodiment described above, a second grid node branches from the SH stage of the detector pixel circuit via a second grid switch. In other words, the second grid node can be either electrically connected or disconnected from the SH stage depending on a switching state of the second grid switch that is disposed in the second line or the second grid node. This embodiment advantageously provides an alternative implementation of the circuit.

The first grid switch of the detector pixel circuit according the invention might be considered the second switch of the pixelated detector according the invention as described above. The second grid switch of the detector pixel circuit according the invention might be considered the third switch of the pixelated detector according the invention as described above.

Further preferred, the output node of the detector pixel circuit according to the invention is further configured to be connected to a column bus. Particularly preferred, the output node of the detector pixel circuit is connected to an ADC via the column bus. Also preferred, a row switch is interconnected between the SH stage and the output node. The row switch is preferably controlled by a row decoder in order to allow imaging by scanning the pixels across the rows of the pixelated detector. Scanning across the columns of the pixelated detector is realized by operation of at least one ADC. Further preferred, the first switch and the first grid switch and/or the second grid switch are controlled by a control unit. The control unit is formed separately to the detector pixel circuit and configured to output respective control signals to the first switch and first grid switch and/or second grid switch, particularly for setting these switches either conductive or non-conductive. Preferably, the control unit is configured to output these control signals in dependence of at least one of a user input and at least one timer (based on a clock signal). Further preferred, the control unit is configured to output control signals for realizing a conventional imaging mode or a fast read out mode.

Another aspect of the present invention relates to a method for operating a pixelated detector according to the invention. Particularly, a first method of the invention is for operating a pixelated detector, wherein each of the detector pixels is configured to receive the sensor input via a first line comprising a first switch and wherein a conducting grid of at least one macropixel is switchable connected to the first lines of a respective subset of detector pixels. Preferably, the conducting grid of the least one macropixel is switchable connected to the first lines of the respective subset of detector pixels via a plurality of respective second switches.

According to this first method of the invention, the pixelated detector is operated either in a first operation mode or in a second operation mode. Therein, the pixelated detector is operated in the first operation mode by setting conductive each of the first switches and by disconnecting the at least one conducting grid from the first lines. Preferably, the at least one conducting grid is disconnected from the first lines by setting non-conductive each of the second switches. According to the first method of the invention, the pixelated detector is operated in the second operation mode by connecting the conducting grid of at least one, preferably each, macropixel to the first lines of the respective subset of detector pixels and by setting conductive one of the first switches of the at least one, preferably each, macropixel and setting non-conductive the other first switches of the at least one macropixel, preferably each of the remaining first switches. Preferably, the at least one conducting grid is connected to first lines of the respective subset by setting conductive each of the second switches.

Further preferred, the first operation mode of this first method is an imaging mode with an exposure time $T_1$ and the second operation mode is a fast readout mode with an exposure time $T_2$, wherein $T_2$ is smaller than $T_1$. According to this embodiment, the at least one macropixel preferably comprises an amount of up to $T_1/T_2$ detector pixels. In other words, if in the fast read out mode, the exposure time is $K=T/T_2$ times shorter than in the imaging mode, then a pixel can integrate the charge delivered by up to K detector diodes in the fast readout mode without being structurally adapted or amended for performing this mode. Hence, a single detector pixel can be utilized for processing the sensor signals of K sensor pixels.

Further, a second method of the present invention relates to operating a pixelated detector of the invention, wherein each of the detector pixels comprises an integrator stage configured for receiving the sensor input and a sample and hold, SH, stage configured for sampling and holding a voltage outputted by the integrator stage and wherein the SH stage of each detector pixel of at least one macropixel is configured to be switchable connected to the conducting grid via a respective third switch. In other words, each detector pixel can be either connected or disconnected from the conducting grid by setting the state of the third switch.

According to this second method of the present invention, the pixelated detector is operated either in a first operation mode or in a second operation mode. Therein, the pixelated detector is operated in the first operation mode by setting non-conductive each of the third switches. In other words, the detector pixels are operated in an isolated manner without being connected to a conducting grid. According to the second method of the invention, the pixelated detector is operated in the second operation mode by setting conductive the third switches of at least one macropixel during the hold phase of the SH stages. In other words, the third switches of each detector pixel constituting a respective macropixel, preferably a respective macropixel of a plurality of macropixels, are set conductive, thus connecting the detector pixels via the at least one conducting grid for operating the detector pixels in a parallel manner. As the detector pixels are parallelized during the hold phase, the sampled voltage signals of all the detector pixels interconnected via the conducting grid become averaged, thereby improving the signal to noise ratio while lowering the spatial resolution of the detected image signal.

Further, a third method of the present invention relates to operating a pixelated detector of the invention, wherein a plurality of first macropixels is formed by a first plurality of subsets of detector pixels having their first lines switchable interconnected with first conducting grids, respectively, wherein a plurality of second macropixels is formed by a second plurality of subsets of detector pixels having their SH stages switchable interconnected with second conducting grids, respectively, and wherein each second macropixel comprises one detector pixel per each of the plurality of first macropixels.

According to this third method of the present invention, the pixelated detector is operated either in a first operation mode or in a second operation mode. Therein, the pixelated detector is operated in the first operation mode by setting conductive each of the first switches, by disconnecting the at least one first conducting grid from the first lines, preferably by setting non-conductive each of the second switches, and by disconnecting the at least one second conducting grid from the SH stages by setting non-conductive each of the third switches. In other words, the detector pixels are operated in an isolated manner without being connected to any conducting grid. According to the second method of the invention, the pixelated detector is operated in the second operation mode by forming the plurality of first macropixels by interconnecting the first lines of a first plurality of subsets of detector pixels with first conducting grids (preferably by setting conductive the plurality of second switches), respectively, and by setting one first switch of each of the first macropixels conductive and the other first switches non-conductive. Thereby, a plurality of active detector pixels is defined, wherein each active detector pixel comprises one conductive first switch. Particularly, one active detector pixel is defined per first macropixel. Further, the plurality of second macropixels is formed by connecting the SH stages of a plurality of second subsets of active detector pixels with second conducting grids, respectively, via a plurality of third switches during the hold phase of the connected SH stages of the active detector pixels.

This third method of the present invention provides the advantages of the first method, i.e. the fast readout mode using the first macropixels with an exposure time that is smaller than the exposure time during imaging mode by a factor that corresponds to the amount of detector pixels per first macropixel, and combines them with the advantages of the second method, i.e. the averaging of a plurality of first macropixels to form second macropixels, thus further increasing the signal to noise ratio, while further reducing the spatial resolution of the signal. Another aspect of the present invention relates to a computer program that configures a data processing apparatus to perform a method for operating a pixelated detector as described above after being loaded into a memory element of the data processing apparatus. The data processing apparatus preferably is connected to pixelated detector and/or to an electron microscope comprising such pixelated detector. Further preferred, the present invention relates to a computer readable memory element with a computer program as described above saved thereon, particularly with a computer program that allows a data processing apparatus to perform a method for operating a pixelated detector as described above after being loaded to a memory element of a data processing apparatus as described above.

The electronic or electric devices and/or any other relevant devices or components according to embodiments of the present invention described herein, except those described explicitly as hardware, may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g. on a PCB or another kind of circuit carrier. The conducting elements may comprise metallization, e.g. surface metallization and/or pins, and/or may comprise conductive polymers or ceramics. Further electrical energy might be transmitted via wireless connections, e.g. using electromagnetic radiation and/or light.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Further aspects and preferred embodiments of the present invention result from the dependent claims, the drawings and the following description of the drawings. Different disclosed embodiments are advantageously combined with each other if not stated otherwise.

In the following, several examples of the invention are described in concise manner.

According to a first example a pixelated sensor is provided, comprising a semiconductor substrate chip with a plurality of sensor pixels and a detector chip with a plurality of detector pixels, wherein each of the plurality of sensor pixels is configured as a photodiode and is electrically connected to an input node of one of the detector pixels, wherein each of the detector pixels is configured to receive a sensor input from the connected sensor pixel, to convert the sensor input into a detector output and to output the detector output to an analog to digital converter, and wherein the detector chip further comprises a plurality of macropixels each macropixel being formed by a subset of detector pixels interconnected by at least one conducting grid with each detector pixel of the subset of detector pixels being configured to be switchable connected to the at least one conducting grid.

According to a second example, in the pixelated sensor according to the first example each detector pixel of the at least one macropixel is further configured for being switchable connected to the respective sensor pixel. According to a third example, in the pixelated sensor according to the first or second example each of the detector pixels is configured for receiving the sensor input via a first line comprising a first switch and the conducting grid of at least one macropixel is switchable connected to the first lines of the respective subset of detector pixels. According to a fourth example, in the pixelated sensor of the third example, each first line of the subset of detector pixels is connected to the conducting grid in between the respective first switch and sensor pixel via a respective second switch.

According to a fifth example, in the pixelated sensor of the previous examples, each of the detector pixels comprises an integrator stage configured for receiving the sensor input and a sample and hold, SH, stage configured for sampling and holding a voltage outputted by the integrator stage. According to a sixth example, in the pixelated sensor according to the fifth example the SH stage of each detector pixel of the at least one macropixel is configured for being switchable connected to the conducting grid via a respective third switch.

According to a seventh example, in the pixelated sensor according to the third and sixth examples a plurality of first macropixels is formed by a first plurality of subsets of detector pixels having their first lines switchable interconnected with first conducting grids, respectively, and a plurality of second macropixels is formed by a second plurality of subsets of detector pixels having their SH stages switchable interconnected with second conducting grids, respectively, wherein each second macropixel comprises one detector pixel per each of a plurality of first macropixels.

According to an eight example, a detector pixel circuit for a detector chip of a pixelated detector is provided, the detector pixel circuit comprising an input node configured for being connected to a sensor pixel of a semiconductor substrate chip of the pixelated detector: a integrator stage configured for receiving a sensor input via the input node and for integrating the received sensor input; a sample and hold, SH, stage configured for sampling and holding a voltage outputted by the integrator stage; an output node configured for receiving a detector output from the SH stage; at least one grid node switchable connected to the input node and/or the SH stage via a grid switch and configured to be connected to another detector pixel circuit.

According to a ninth example, the detector pixel circuit according to the eighth example further comprises a first line interconnecting the input node and the integrator stage and a first switch disposed in the first line between the input node and the integrator stage, wherein a first grid node branches from the first line in between the first switch and the input node via a first grid switch. According to a tenth example, in the detector pixel circuit according to the eighth or ninth example, a second grid node branches from the SH stage via a second grid switch. According to an eleventh example, in the detector pixel circuit of the previous examples, the output node is further configured to be connected to a column bus and a row switch is interconnected between the SH stage and the output node.

According to a twelfth example, a method for operating a pixelated detector according to the third example is provided, wherein the operating is performed by, in a first operation mode, setting conductive each of the first switches and disconnecting the at least one conducting grid from the first lines, or, in a second operation mode, connecting the conducting grid of at least one macropixel to the first lines of the respective subset of detector pixels and by setting conductive one of the first switches of the at least one macropixel and setting non-conductive the other first switches of the at least one macropixel. According to a thirteenth example, in the method according to the twelfth example the first operation mode is an imaging mode with an exposure time T1, the second operation mode is a fast readout mode with an exposure time T2 smaller than T1, and the at least one macropixel is formed of up to T1/T2 detector pixels.

According to a fourteenth example, a method for operating a pixelated detector according to the sixth example is provided, wherein the operating is performed by, in a first operation mode, setting non-conductive each of the third switches, or, in a second operation mode, setting conductive the third switches of at least one macropixel during the hold phase of the SH stages.

According to a fourteenth example, a method for operating a pixelated detector according to the seventh example is provided, wherein the operating is performed by, in a first operation mode, setting conductive each of the first switches, disconnecting the at least one first conducting grid from the first lines and setting non-conductive each of the third switches disconnecting the at least one second conducting grid from the SH stages, or, in a second operation mode, forming the plurality of first macropixels by interconnecting the first lines of a first plurality of subsets of detector pixels with first conducting grids, respectively, and by setting one first switch of each of the first macropixels conductive and the other first switches non-conductive, thereby defining on active detector pixels per first macropixel each comprising one conductive first switch, and forming the plurality of second macropixels by connecting the SH stages of a plurality of second subsets of active detector pixels with second conducting grids, respectively, via a plurality of third switches during the hold phase of the connected SH stages.

BRIEF DESCRIPTION OF THE DRAWINGS

The features of the invention become apparent to those skilled in the art by the detailed description of exemplary embodiments with reference to the attached drawings in which.

DETAILED DESCRIPTION OF THE DRAWINGS

Figure 1:
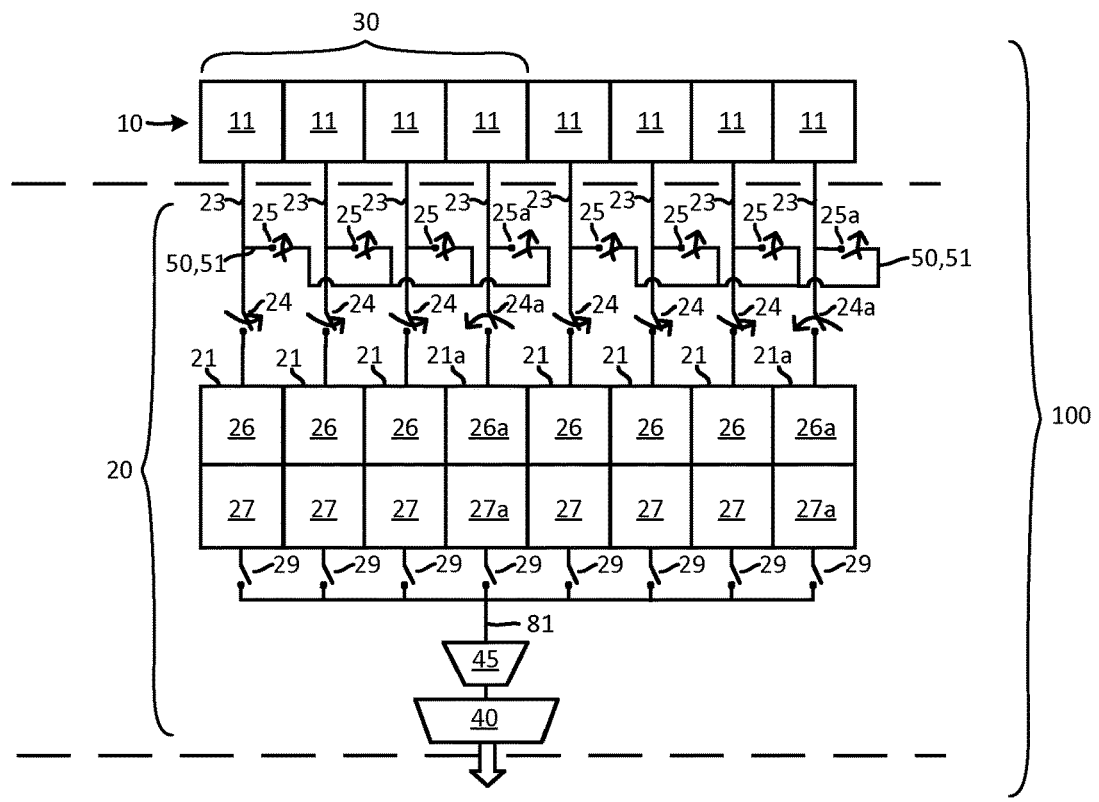
FIG. 1 shows a schematic cross section of a pixelated detector according to a first embodiment.

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art.

Accordingly, processes, elements, and techniques that are not considered necessary to those having ordinary skill in the art for a complete understanding of the aspects and features of the present invention may not be described.

As used herein, the term "and/or" includes any and all combinations of one or more of the associated listed items. Further, the use of "may" when describing embodiments of the present invention refers to "one or more embodiments of the present invention. In the following description of embodiments of the present invention, the terms of a singular form may include plural forms unless the context clearly indicates otherwise.

It will be understood that although the terms first" and "second" are used to describe various elements, these elements should not be limited by these terms. These terms are only used to distinguish one element from another element. For example, a first element may be named a second element and, similarly, a second element may be named a first element, without departing from the scope of the present invention. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

Figure 2:
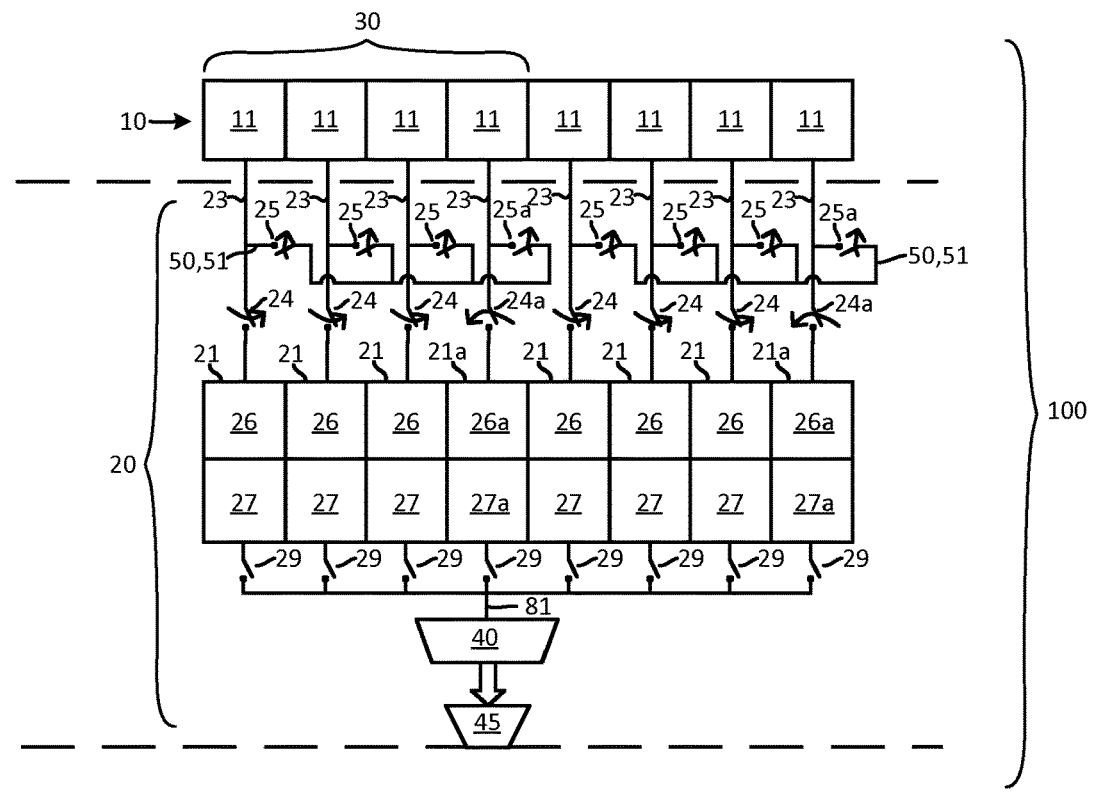
FIG. 2 shows a schematic cross section of a pixelated detector according to a second embodiment.
Figure 3:
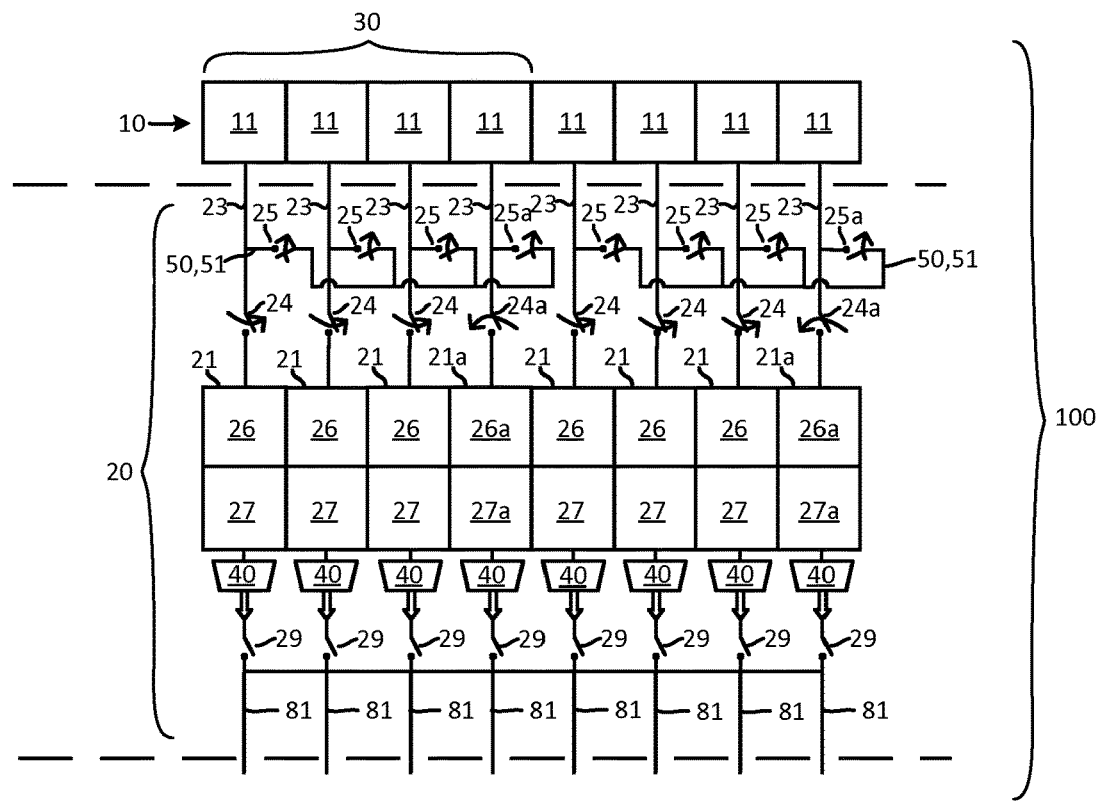
FIG. 3 shows a schematic cross section of a pixelated detector according to a third embodiment.

FIGS. 1 to 3 each show a schematic cross section of a pixelated detector 100 according to a first to third embodiment of the present invention. The illustrated embodiments differ with respect to the ADC(s) 40, while the other aspects are commonly described in the following.

The pixelated detector 100 comprises a semiconductor substrate chip 10 comprising a plurality of sensor pixels 11. The semiconductor substrate chip 10 is connected to a detector chip 20 comprising a plurality of detector pixels 21, several electrical connections 23, 50, several switching elements 24, 25, 28, 29 and at least one analog to digital converter, ADC, 40. The semiconductor substrate chip 10 and the detector chip 20 are bump bonded to each other, however other forms of electric connection e.g. wire bonding may be used.

The semiconductor substrate chip 10 is composed of doped silicon; however other semiconductors substrates such as Germanium or InGaAs may be utilized as well. Each sensor pixel 11 of the semiconductor substrate chip 10 is configured as a photodiode, exemplarily by utilizing a weakly n-doped silicon basic material comprising a highly n-doped silicon backside layer and a p-doped front layer. Therein, the n-doped backside layer operates as cathode facing the detector chip 20 and configured for contacting the detector chip 20. Further, a passivation and anti reflection layer may be disposed on the front side. However, the sensor pixels 11 may be configured as a photodiode in a different manner. Essentially, each of the sensor pixels 11 is configured to convert incident light into electrical charges and to output a sensor signal that is proportional to the amount of the incident light.

Each of the sensor pixels 11 is electrically connected to a detector chip 21 via a first line 23 for outputting a sensor signal to the detector chip 21. Therein, the first line 23 may be at least partially formed as wiring, metallization, or the like. A first switch 24 is disposed in each of the first lines 23, thus enabling to set either conductive or non-conductive the electrical connection between a sensor pixel 11 and the respective detector pixel 21. Thus sensor signal are selectively transmitted from a sensor pixel 11 to the respective detector pixel 21.

A plurality of first conducting grids 51 interconnects respective subsets of four first lines 23 of the pixelated detector 100. Therein, each first line 23 is switchable connected to the respective first conducting grid 51 via a respective second switch 25. Therein, the second switch 25 is disposed in between the sensor pixel 11 and the first switch 24 of the respective first line 23. Thus, each first line 23 can be individually connected and disconnected to a respective conducting grid 50. As explained in more detail below, the pixels 11, 21, the first lines 23 of which are connected via respective first conducting grids 51, form macropixels 30.

Each of the detector pixels 21 comprises an integrator stage 26 configured for receiving the sensor signal via the first line 23 and via the first switch 24 and configured for integrating the received sensor signal during a set integration time period as explained in more detail below. The integrator stage 26 is followed by a sample and hold, SH, stage 27 that is configured to sample and hold a voltage signal output from the integrator stage 26. In other words, the SH stage 27 is configured to output a voltage signal received from the integrator stage 26 at a given time point for a set holding time period as explained in more detail below.

The cross sections of FIGS. 1 to 3 show a single column of a pixelated detector 100 comprising a plurality of rows of detector pixels 21 extending into the image plane. Each row of detector pixels 21 is connected via a row switch 29 to the respective column bus 81 shown in the cross sections. By setting the switches 24, 25 and 29 either conductive or non-conductive, the pixelated sensor 100 can be operated in a conventional imaging mode or in a fast read out mode, e.g. for obtaining preliminary images, as described in more detail below.

In the conventional imaging mode, each of the first switches 24 disposed in the first lines 23 is set conductive and each of the second switches 25 connecting the first lines 23 to the respective conducting grids 51 is set non-conductive. Hence, each sensor pixel 11 is connected in an individual manner to its respective detector pixel 11. In operating the pixelated detector 100 of FIGS. 1 to 3, the illustrated column of detector pixels 21 as shown in these Figures is selected via a respective column switch (not shown) controlled by a column decoder (not shown). Then, by consecutively setting row switches 29 conductive, individual detector pixels 21 are selected to be read out (scanned) in an individual manner.

In the pixelated detector of the first embodiment shown in FIG. 1, the column bus 81 is connected to a column multiplexer 45 that further receives the column busses (not shown) of other columns (not shown) of the pixelated detector 100. The column multiplexer 45 selects one column at a time and at one point forwards a detector signal received from an individual detector pixel 21 to an ADC 40, i.e. of an individual detector pixel 21 of the illustrated column of detector pixels 21 that was selected via the respective row switch 29. The ADC 40 converts the detector signal into the digital domain for data acquisition and processing.

For operating the pixelated detectors 100 of FIGS. 1 to 3 in the fast read out mode, each of the second switches 25 is set conductive for connecting each of the first lines 23 to the respective first conducting grid 51. Thus, from the column of eight pixels 11, 21 shown in FIGS. 1 to 3, the first to fourth pixels 11, 21 are connected to a first conducting grid 51 and the fifth to eighth pixels 11, 21 are connected to another first conducting grid 51 via the second switches 25. Thus, two macropixels 30 consisting of a subset of four times four pixels 11, 21 are formed, two rows of pixels 11, 21 of which are illustrated in FIGS. 1 to 3.

Due to the interconnected sensor pixels 11, each of the macropixels 30 receives 16 times the incident radiation, particularly electrons such as backscattered electrons, of an individual detector pixel 21. Thus, sufficient image signal strength can be achieved in a fraction of the exposure time of an individual pixel 11, 21. Hence, within each macropixel 30, all expect one of the first switches 24 are set non-conductive, whereas one first switch 24 remains conductive.

Thus, the sensor signals of each of the sensor pixels 11 that are interconnected via a respective conducting grid 51 are transmitted to the single detector pixel 21 which is connected to the first line 23 comprising the one conductive first switch 24, i.e. to the active detector pixel 21a. Thus, the sensor signal from the interconnected sensor pixels 11 forming a macropixel 30 is processed at once by the active integrator stage 26a and the active SH stage 27 of the active detector pixel 21a and a single detector signal is output via the respective row switch 29 corresponding to the active detector pixel 21a to the column bus 81. This detector signal is forwarded to the ADC 40 via the column multiplexer 45. The ADC 40 thus only reads outputs of active pixels 21a and thus 16-times less signals than in imaging mode, therefore achieving a 16-times higher rate.

The pixelated detectors 100 illustrated as schematic cross sections in FIGS. 2 and 3 differ from the pixelated detector 100 of FIG. 1 solely with respect to the amount and position of the ADC(s) 40, wherein the operation steps regarding the switching between the conventional imaging mode and the fast read out mode are as described with respect to FIG. 1.

The pixelated detector 100 of FIG. 2 differs from that of FIG. 1 in that it comprises an ADC 40 in each column bus 81. Each of the ADCs 40 of FIG. 2 is configured to receive the detector signals output from a whole column of detector pixels 21. wherein the signal actually received by the respective ADC 40 is determined by setting the respective row switch 29. Hence, in FIG. 2 the ADCs 40 are arranged prior to the column multiplexer 45.

The pixelated detector 100 of FIG. 3 differs from that of FIGS. 1 and 2 in that it comprises an ADC 40 for each detector pixel 21. In other words, each of the detector pixels 21 is configured as a digital pixel. Thus, no ADCs 40 have to be disposed in the column busses 81.

Figure 4:
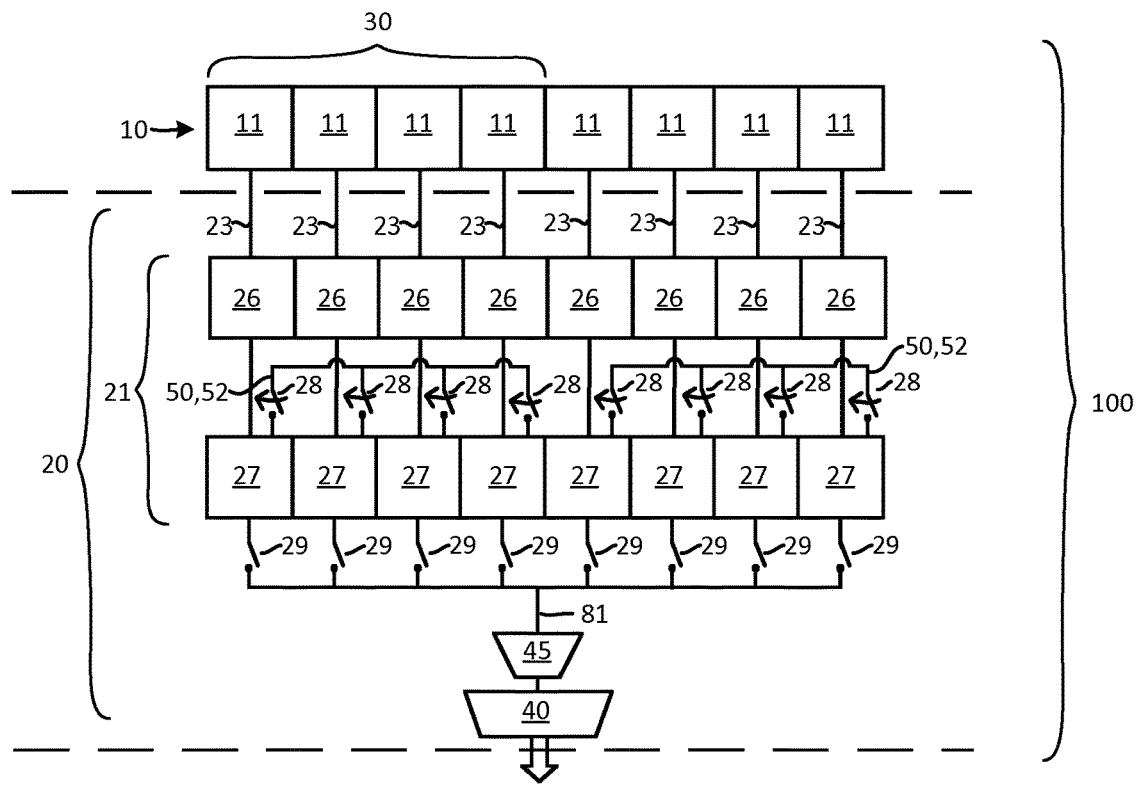
FIG. 4 shows a schematic cross section of a pixelated detector according to a fourth embodiment.
Figure 5:
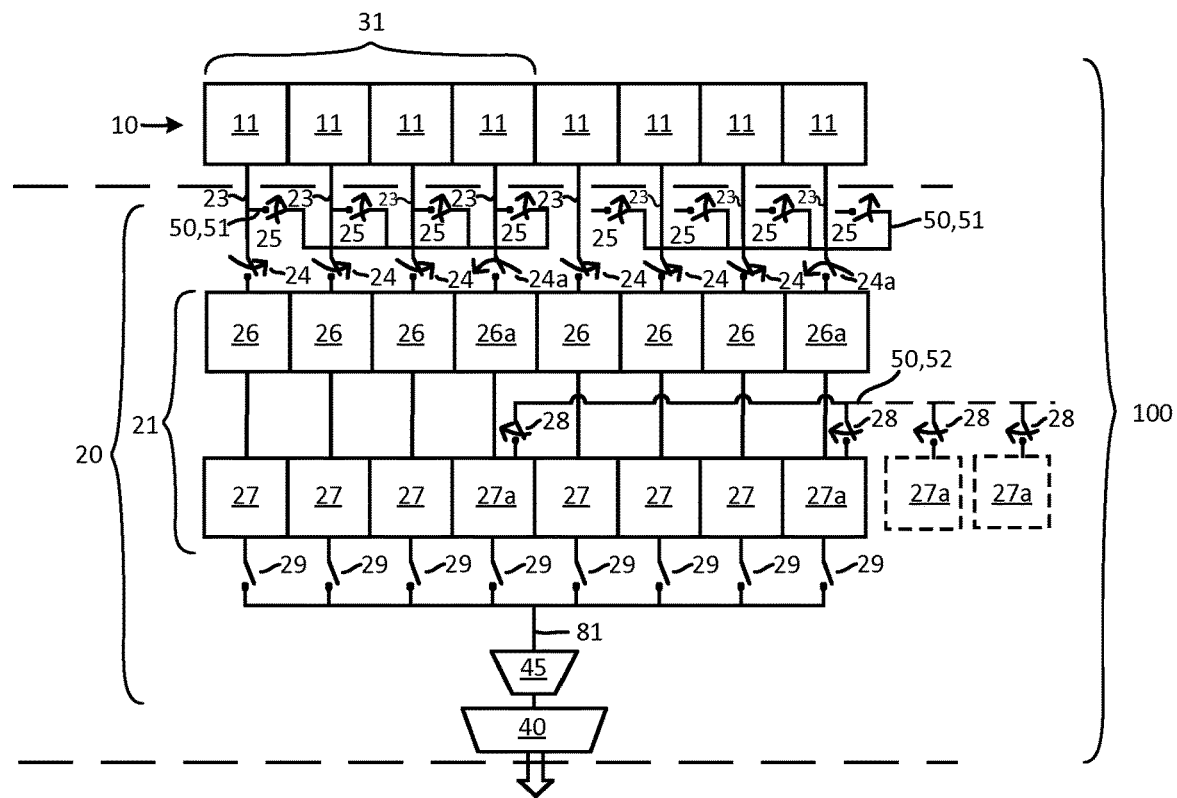
FIG. 5 shows a schematic cross section of a pixelated detector according to a fifth embodiment.

Although the pixelated detectors according to the fourth and fifth embodiments as shown in FIGS. 4 and 5 comprise a single ADC 40 per detector chip 20 as in FIG. 1, these embodiments can also be realized using multiple ADCs 40 as described for FIGS. 2 and 3.

The pixelated detector 100 of the embodiment shown in FIG. 4 differs from the pixelated detectors 100 of the first to third embodiments in that the conducting grids 50 are not connected to the first lines 23. Further, no first switches 24 are disposed in the first lines 23 but the sensor pixels 11 are rather connected constantly to the respective detector pixels 21. In the pixelated detector 100 of the fourth embodiment, second conducting grids 52 are switchable connected directly to the SH stages 27 of the respective detector pixels 21. Hence, the integrator stage 26 of each detector pixel 21 receives the sensor signal from the respective sensor pixel 11 irrespective of the set operation mode and the output of each integrator stage 26 is provided solely to the subsequent SH stage 27. Each of the SH stages 27 is connected to a respective second conducting grid 52 via a third switch 28. Therein, each of the second conducting grids 52 interconnects four SH stages 27 per column of detector pixels 21 and thus macropixels 30 comprising 16 detector pixels 21 are formed.

In the conventional imaging mode, each of the third switches 28 is set non-conductive and each of the SH stages 27 processes solely the output received from the prior integrator stage 26. However, by setting conductive each of the third switches 28. subsets of detector pixels 21, particularly of SH stages 27, are interconnected via the respective second conductive grid 52 and thus share the outputs received from the prior integrator stages 26. This affects an averaging of the voltages received by each of the interconnected SH stages 27 such that each SH stage 27 receives the same voltage signal. Thus, the signals of the interconnected pixels 11, 21 are averaged with increased SNR and reduced resolution.

The pixelated detector 100 of the fifth embodiment as shown in FIG. 5 is a combination of the pixelated detectors 100 according to the first embodiment and the fourth embodiment. Therein, a plurality of first macropixels 31 is formed in the same manner as the macropixels 30 described with respect to FIG. 1 by interconnecting a plurality of pixels 11, 21 by interconnecting the respective first lines 23 via respective first conducting grids 51 by setting conductive respective second switches 25 interconnected between the conducting grids 52 and the each of the first lines 23. Further, solely one of the first switches 24 disposed in the first lines 23 is set conductive, while the remaining first switches 24 are set non-conductive. Hence, as already described with respect to FIG. 1, the sensor signals provided by the plurality of interconnected sensor pixels 11 are commonly transmitted to and processed by a single detector pixel 21, i.e. the active detector pixel 21a.

In the pixelated detector 100 of the fifth embodiment shown in FIG. 5, each of a plurality of second conductive grids 52 is switchable connected via a plurality of respective third switches 28 to a respective subset of the active detector pixels 21a. Thus, a plurality of second macropixels 32 is formed, each comprising a plurality of interconnected active detector pixels 21a. Particularly, the second conductive grids 52 interconnect the active SH stages 27a of the respective active pixels 21a. Thus, via the second conductive grids 52, the detector signals output from the plurality of active detector pixels 21a are averaged such that each of the active SH stages 27a of the respective second macropixel 32 receives the same voltage. Thus, the image signals of the pixels 21a of the respective second macropixel 32 are averaged, thereby increasing the signal to noise ratio while decreasing spatial resolution.

Figure 6:
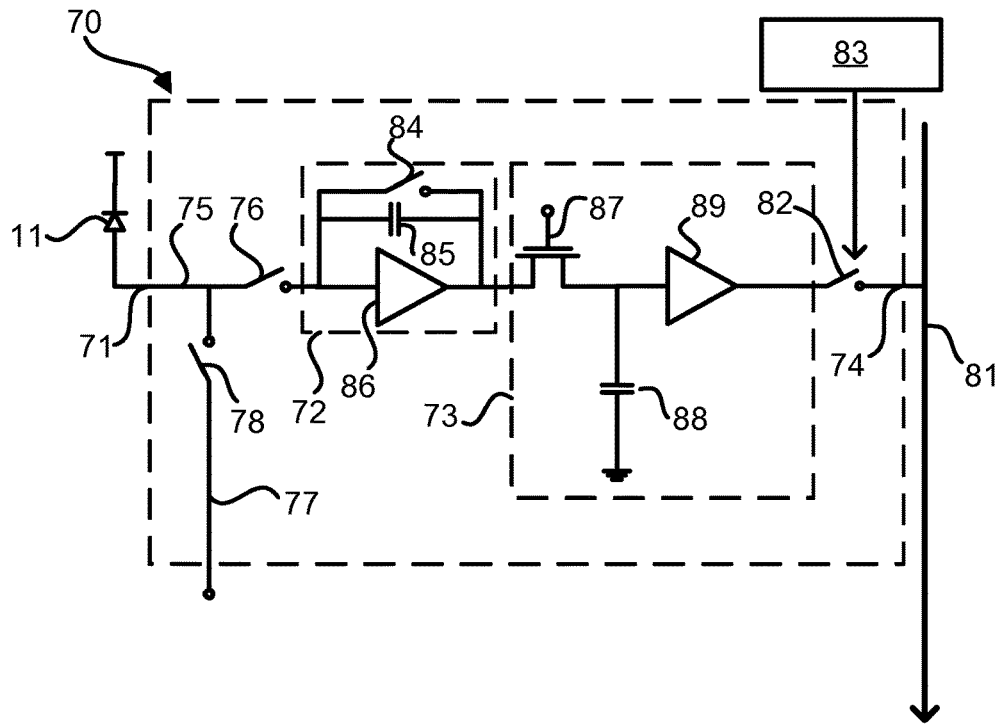
FIG. 6 shows a schematic illustration of a detector pixel circuit according to a first embodiment.
Figure 7:
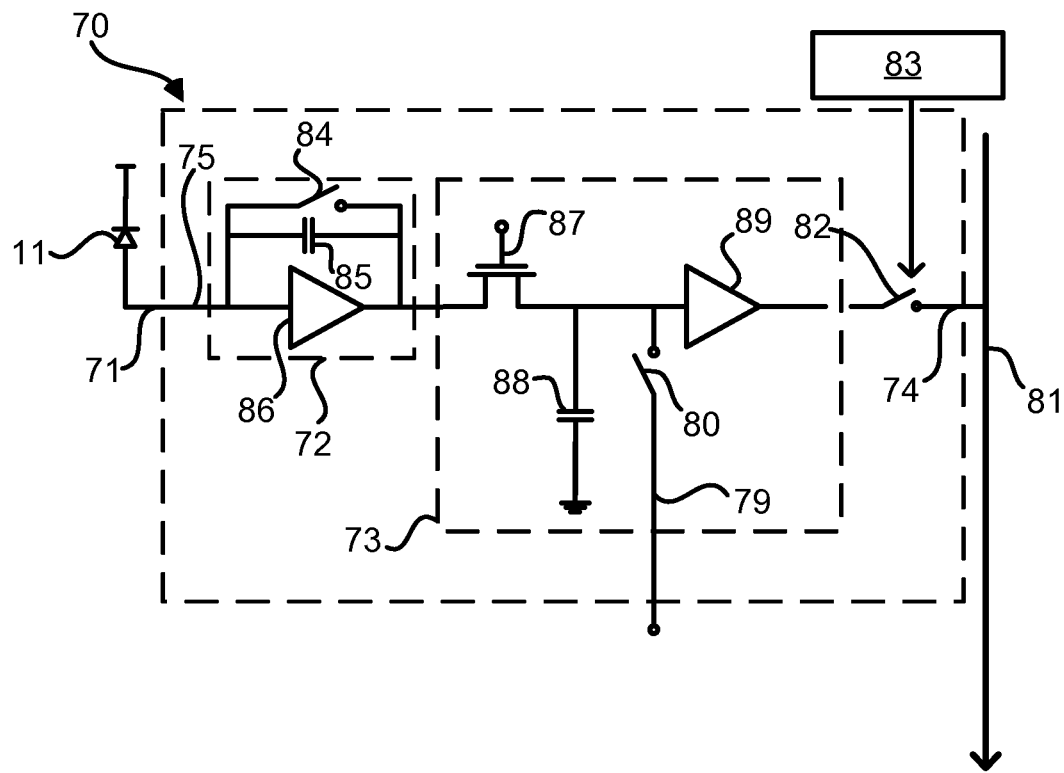
FIG. 7 shows a schematic illustration of a detector pixel circuit according to a second embodiment.
Figure 8:
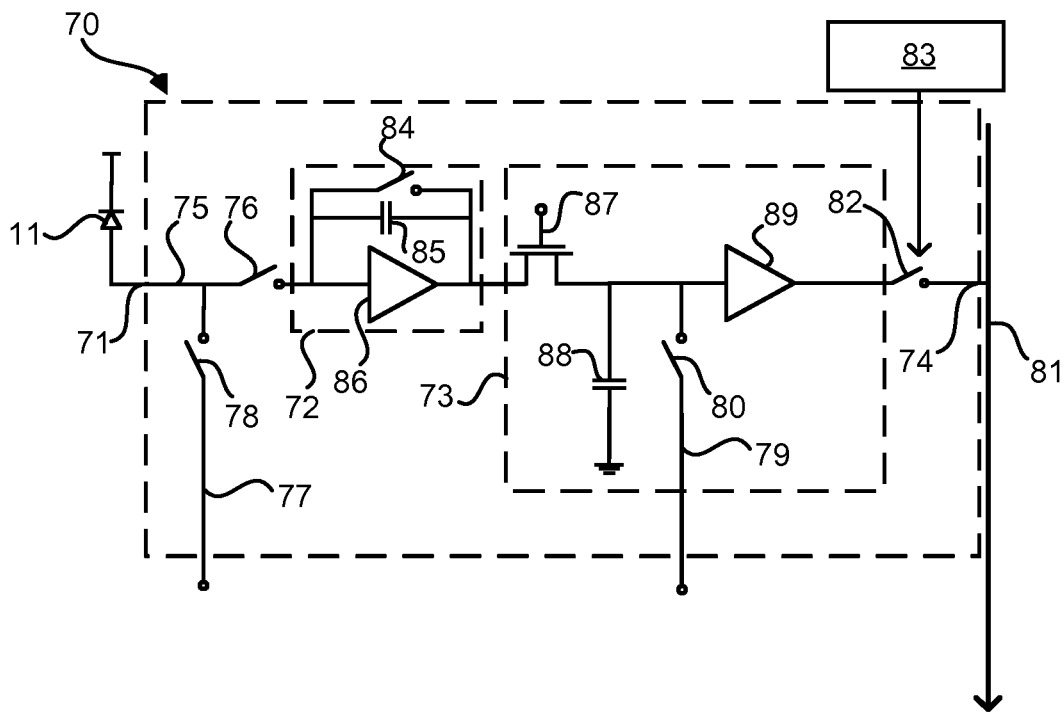
FIG. 8 shows a schematic illustration of a detector pixel circuit according to a third embodiment.

FIGS. 6 to 8 show schematic illustrations of detector pixel circuits 70 according to a first to third embodiment and are commonly described in the following where the circuits are equal.

Each of the detector pixel circuits 70 comprises an input node 71 that is configured to receive a sensor signal from a photodiode 11, particularly from a sensor pixel 11 configured as photodiode. The input node 71 may be formed as a pad for receiving a wire or bump bond.

The detector pixel circuits 70 further comprise an integrator stage 72 having an input that is connected to the input node 71 of the detector pixel circuit 70 and having an output. An integration operational amplifier 88 is interconnected between the input and the output of the integrator stage 72. An integration capacitor 85 is connected in parallel to the integration operational amplifier 86 and a reset switch 84 is connected in parallel to the integration capacitor 85. Preferably, the integrator stage 72 is configured as miller integrator. The integrator stage 72 is configured to receive the sensor signal from the photodiode 11 via the input node 71 and to integrate, i.e. accumulate, the sensor signal for a set integration time period. Particularly, during the integration time period the electric charges of the sensor signal are consecutively stored in the integration capacitor 85 and amplified via the operational amplifier 86 such that a voltage proportional to the accumulated sensor signal applies at an output node of the integrator stage 72. Via the reset switch 84, the integration capacitor 85 can be discharged to ground thus resetting the integrator stage 72 for a new integration cycle.

The integrator stage 72 is followed by a sample and hold, SH, stage 73 having an input that is connected to the output of the integrator stage 72 and having an output. The channel of a sampling transistor 87 (operated as sampling switch) is connected in series with a SH operational amplifier 89 in between the input and the output of the SH stage 73. In between the sampling transistor 87 and the SH op amp 89 branches a ground connection that comprises a sampling capacitor 80 interconnected between the branching node and ground. The SH stage 73 is configured to receive the voltage at the output of the integrator stage 72 at a given time, i.e. when the channel of sampling transistor 87 is set conductive, and to apply the received voltage for a set hold time period to the output of the SH stage 73.

The output of the SH stage 73 is connected to an output node 74 of the detector pixel circuit 70 via a row switch 82. Therein, row switch 82 might correspond to the row switches 29 of the pixelated detectors 100 of the FIGS. 1 to 5 and is controlled by a row decoder 83. The output node 74 of the SH stage 73 is connected to a column bus 81 that interconnects a plurality of detector pixel circuits 70 of a column of an arrayed detector chip 20 as e.g. shown in FIGS. 9 to 11 for the first to third embodiments, respectively.

Figure 12:
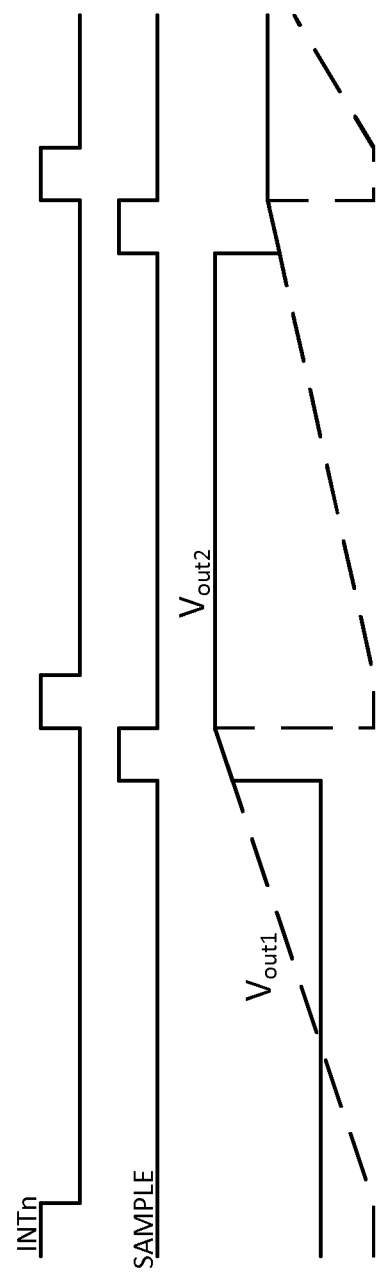
FIG. 12 schematically illustrates the integration and sample/hold phases of the detector pixel circuit according to an embodiment.

Considered that the reset switch 84 is operated by a control signal INTn and the sampling transistor 87 is operated by a control signal SAMPLE, FIG. 12 shows the time diagram of the two control signals, INTn and SAMPLE, during the typical operation of the detector pixel circuit 70 for both, the conventional imaging mode and the fast read out mode. As shown in FIG. 12. when control signal INTn is low, the charge integration occurs in the integration capacitor 85 as illustrated by voltage Vout1 in FIG. 12. Therein, Vout1 applies to an output of the integrator stage 72. At the end of a set integration time period, the sampling occurs.

Therein, the voltage Vout1 is stored on the sampling capacitor 88 and buffered to the output of the SH stage 73, as illustrated by voltage Vout2 in FIG. 12. After the sampling time period, control signal INTn is set to high for setting conductive the reset switch 84, thus resetting the integrator stage 72, particularly integration capacitor 85, for a new integration.

The detector pixel circuit 70 according to a first embodiment as shown in FIG. 6 further comprises a first line 75 that connects the input node 71 with the integrator stage 72 of the detector pixel circuit 70. The first line 75 might be a wire connection, a metallization or the like. A first switch 76 is disposed in the first line 75 and can be set either conductive or non-conductive in response to a control signal output by a control unit (not shown). Hence, the sensor signal applied to the input node 71 can be selectively applied to integrator stage 72.

A first grid node 77 branches from the first line 75 in between the input node 71 and the integrator stage 72 of the detector pixel circuit 70. The first grid node 77 comprises a first grid switch 78 that can be set either conductive or non-conductive in response to a control signal output by a control unit (not shown). The first grid node 77 is configured to be connected to another detector pixel circuit 70 configured similarly or identically to that shown in FIG. 6. Hence, by setting first grid switch 78 either conductive or non-conductive a plurality of detector pixel circuits 70 can be either interconnected to a grid or operated individually.

Figure 9:
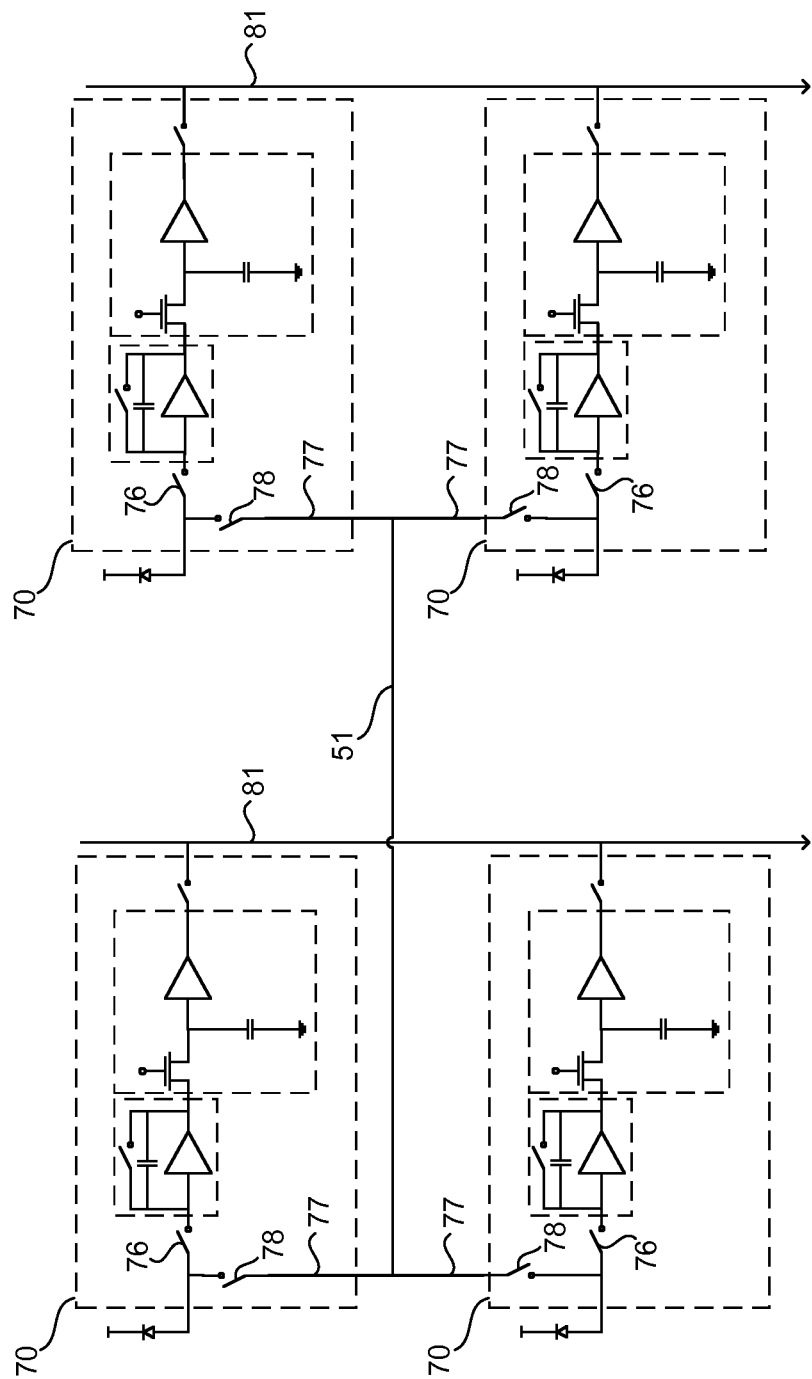
FIG. 9 shows a schematic illustration of a gird of connected detector pixel circuits according to the first embodiment.

FIG. 9 shows a grid of interconnected detector pixel circuits 70 according to the first embodiment. Therein, each of the first grid nodes 77 is connected to the other first grid nodes 77 thus forming a first conducting grid 51 interconnecting the first lines 75 of the detector pixel circuits 70 in between the respective input nodes 71 and first switches 76 of the individual detector pixel circuits 70. The interconnected detector pixel circuits 70 can thus form at least part of a macropixel 30 as described above. By setting each of the first grid switches 78 non-conductive and setting each of the first switches 76 conductive, each of the interconnected detector pixel circuits 70 operates individually in the conventional imaging mode as described above. By setting conductive each of the first grid switches 78 and setting conductive one first switch 76 of the interconnected detector pixel circuits 70, while setting non-conductive the remaining first switches 76 of the detector pixel circuits 70, the detector pixel circuits 70 of the macropixel 30 are operated in fast read out mode as described above.

FIG. 7 shows a schematic illustration of a detector pixel circuit 70 according to a second embodiment. Therein, a second grid node 79 does not branch from the first line 75 but branches instead from the SH stage 73, particularly prior to the SH op amp 89 and subsequently to the ground connection comprising the sampling capacitor 88. A second grid switch 80 is disposed in the second grid node 79, thus allowing to set the second grid node 79 either conductive or non-conductive. The second grind node 79 is configured to be connected to a conductive grid and/or another detector pixel circuit 70 according to the second embodiment. Thus, by controlling the conductivity of the second grid switch 80, the second grind node 79 can be either connected or disconnected from a conducting grid 50.

Figure 10:
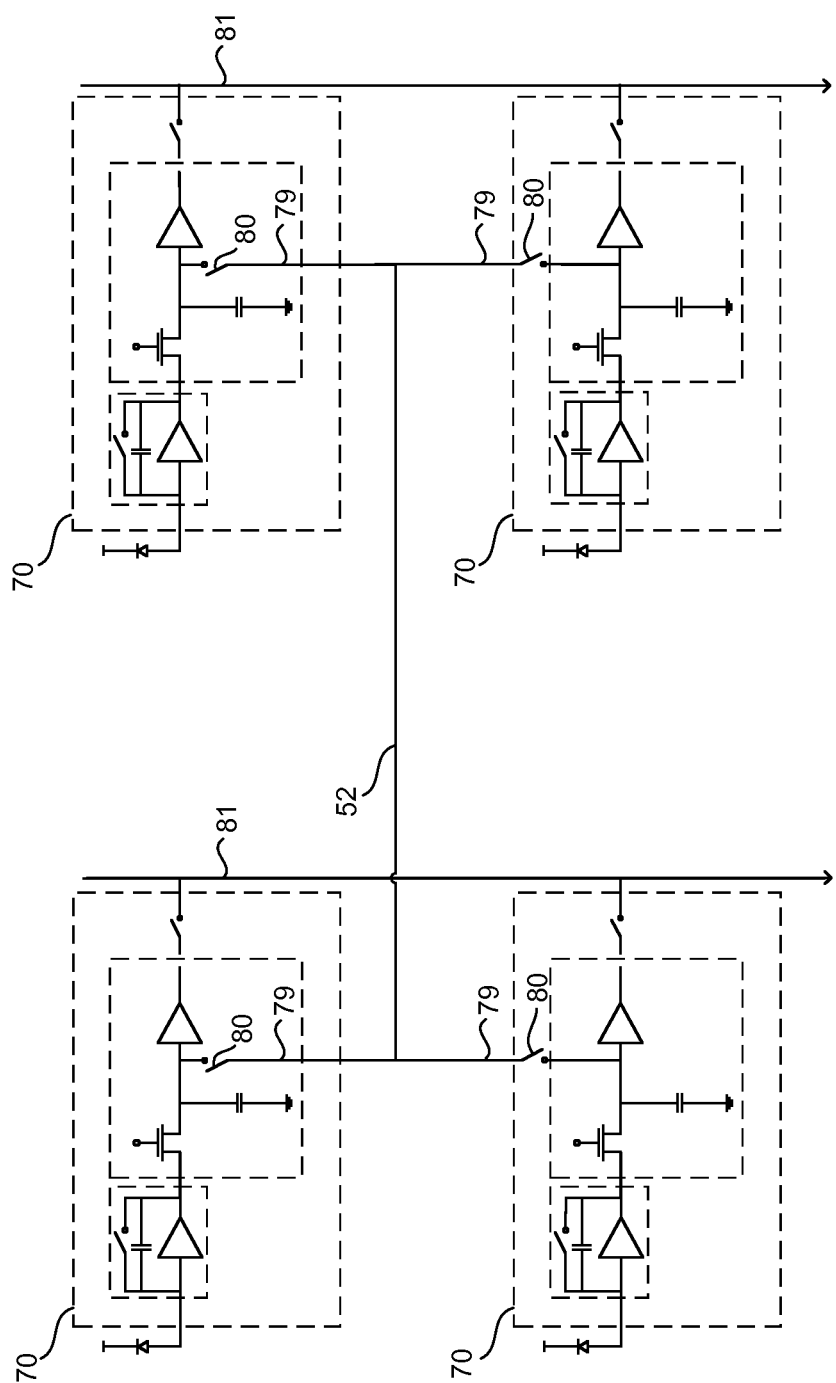
FIG. 10 shows a schematic illustration of a gird of connected detector pixel circuits according to the second embodiment.

FIG. 10 shows a grid of interconnected detector pixel circuits 70 according to the second embodiment. Therein, each of the second grid nodes 79 is connected to the other second grid nodes 79 thus forming a second conducting grid 52 interconnecting the SH stages 73 of the detector pixel circuits 70. The interconnected detector pixel circuits 70 can form at least part of a macropixel 30 as described above. Thus, by setting each of the second grid switches 80 non-conductive, each of the interconnected detector pixel circuits 70 operates individually in the conventional imaging mode as described above. By setting conductive each of the second grid switches 80, each SH stage 27 of the interconnected detector pixel circuits 70 of a macropixel 30 receives the same voltage signal from prior integrator stages 26 thus averaging the received signals, increasing S/N ratio and decreasing spatial resolution.

According to the second embodiment, each detector pixel circuit 70 integrates the current of a single diode pixel 11 and an averaging of the signals of a defined subset of pixels 11, 21 is performed by means of charge sharing among the sampling capacitors 88 of the sample and hold stages 73, e.g. by short-circuiting the top plates. Such short circuit is only momentarily and occurs in the hold phase. Thus, according to the second embodiment, the second grid switch 80 dynamically switches in each frame, e.g. subsequently to setting high SAMPLE in FIG. 12. On the contrary, the first grid switch 78 of the first embodiment is always closed in the fast read out mode. The second embodiment has the advantage of avoiding the presence of a switch at the input nodes 71, which are very sensitive nodes, and prevents the creation of a capacitive load of the first conductive grid 51. However, the sensor signals integrated by the single detector pixel circuits 70 of the second embodiment during a short exposure time of a fast read out operation might be small. Thus, according to the second embodiment larger front-end gains in the integrator stage 72 might be required than in the first embodiment.

FIG. 8 shows a schematic illustration of a detector pixel circuit 70 according to a third embodiment comprising the first grid node 77 branching from the first line 75 and having the first grid switch 78 as described with respect to FIGS. 6 and 9 as well as further comprising the second grid node 79 branching from the SH stage 73 and having the second grid switch 80 as described with respect to FIGS. 7 and 10. The functions of the first and second grid nodes 77, 79 and first and second grid switches 78, 80 are the same as described there.

Figure 11:
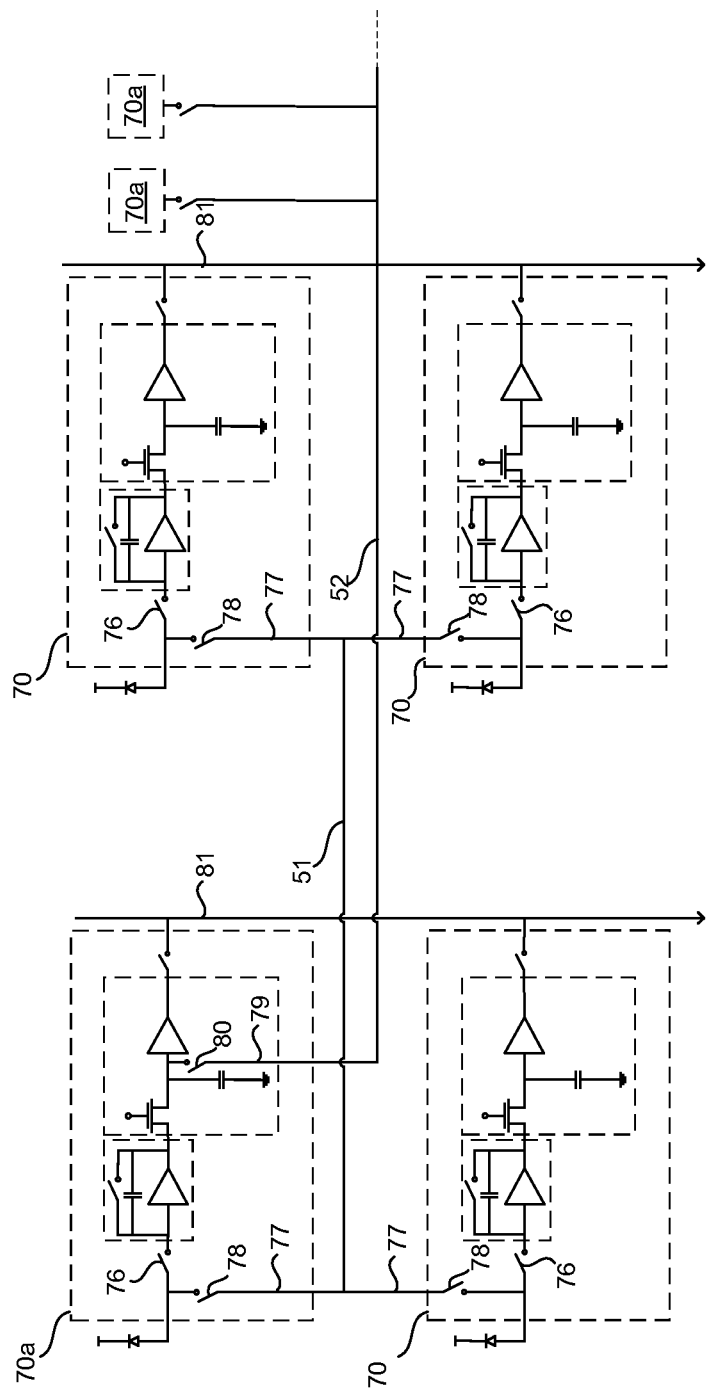
FIG. 11 shows a schematic illustration of a gird of connected detector pixel circuits according to the third embodiment.

FIG. 11 shows a grid of interconnected detector pixel circuits 70 comprising active detector pixel circuits 70a according to the third embodiment and a plurality of detector pixel circuits 70 according to the first embodiment. Therein, each of the first grid nodes 77 of the plurality of detector pixel circuits 70, 70a is connected to other first grid nodes 77. Thereby first conducting grids 51 interconnecting the input nodes 71 of the detector pixel circuits 70,70a in between the respective input nodes 71 and first switches 76 of the individual detector pixel circuits 70, 70a are formed. Each first conducting grid 51 thus connects detector pixel circuits 70 according to the first embodiment and active detector pixel circuits according to the third embodiment. The detector pixel circuits 70, 70a interconnected via a respective first conductive grid 51 form at least part of a first macropixel 31 as described above. Therein, only the first switch 76 of the active detector pixel circuit 70a is set conductive, while the first switches 76 of the remaining detector pixel circuits 70 are set non-conductive. Thus, solely the active detector pixel circuit 70a processes the sensor signals provided by the plurality of photodiodes 11 connected to the input nodes 71 of the detector pixel circuits 70, 70a.

The second grid node 79 of the active detector pixel circuit 70a is connected to other second grid nodes 79 of other active detector pixel circuits 70a thus forming a second conducting grid 52 interconnecting the SH stages 73 of the active detector pixel circuits 70a. The interconnected active detector pixel circuits 70a thus form at least part of a second macropixel 32 as described above. Each second conducting grid 52 thus connects solely active detector pixel circuits according to the third embodiment. By setting each of the second grid switches 80 non-conductive, each of the first macropixels 31 is operated individually, thus providing the advantages as described above. Further, by setting each of the second grid switches 80 conductive, the signals applied to the active SH stages 73a of each of the active detector pixel circuits 70a interconnected via the second conducting grid 52 receive the same voltage signal, which is the average of the voltage signals output by the active integrator stages 72a. Hence, the signals of multiple first macropixels 31 are averaged and thus the signal to noise ratio is further improved, while the spatial resolution is further limited.

REFERENCE SIGNS 10 substrate chip
11 sensor pixels
20 detector chip
21 detector pixels
21a active detector pixel
22 input node
23 first line
24 first switch
25 second switch
26 integrator stage 26a active integrator stage
27 sample and hold, SH, stage
27a active SH stage
28 third switch
29 row switch
30 macropixel
31 first macropixel
32 second macropixel
40 analog-to-digital converter (ADC)
50 conducting grid
51 first conducting grid
52 second conducting gird
70 detector pixel circuit
71 input node
72 integrator stage
73 sample and hold, SH, stage
74 output node
75 first line
76 first switch
77 first grid node
78 first grid switch
79 second grid node
80 second grid switch
81 column bus
82 row switch
83 row decoder
84 reset switch
85 integration capacitor
86 integration operational amplifier
87 sampling transistor
88 sampling capacitor
89 SH operational amplifier
100 pixelated sensor

The invention claimed is:

1. Pixelated sensor, comprising a semiconductor substrate chip with a plurality of sensor pixels and a detector chip with a plurality of detector pixels,
wherein each of the plurality of sensor pixels is configured as a photodiode and is electrically connected to an input node of one of the detector pixels,
wherein each of the detector pixels is configured to receive a sensor input from the connected sensor pixel, to convert the sensor input into a detector output and to output the detector output to an analog to digital converter, and
wherein the detector chip further comprises a plurality of first macropixels and a plurality of second macropixels, wherein each first macropixel is formed by subset of detector pixels switchably interconnected via a first conducting grid and wherein each second macropixel is formed by a subset of first macropixels switchably interconnected via a second conducting grid,
wherein each of the detector pixels is configured for receiving the sensor input via a first line comprising a first switch, wherein the first conducting grid of each first macropixel is switchably connected to the first lines of the respective subset of detector pixels, and wherein each first line of the subset of detector pixels is connected to the first conducting grid in between the respective first switch and sensor pixel via a respective second switch.

2. Pixelated sensor according to claim 1, wherein each detector pixel is further configured for being switchable connected to the respective sensor pixel.

3. Pixelated sensor according to claim 1,
wherein each of the detector pixels comprises an integrator stage configured for receiving the sensor input and a sample and hold, SH, stage configured for sampling and holding a voltage outputted by the integrator stage.

4. Pixelated sensor according to claim 1, wherein the SH stage of one active detector pixel per first macropixel is configured for being switchable connected to one of the second conducting grids via a respective third switch.

5. Detector pixel circuit according to claim 4, wherein the output node is further configured to be connected to a column bus and a row switch is interconnected between the SH stage and the output node.

6. The pixelated sensor according to both of claim 1,
wherein the plurality of first macropixels is formed by a plurality of subsets of detector pixels, each subset of detector pixels having their first lines switchably interconnected with a respective first conducting grid,
wherein the plurality of second macropixels is formed by a plurality of subsets of first macropixels, each subset of first macropixels having the SH stages of their active detector pixels switchably interconnected with a second conducting grid.

7. Detector pixel circuit for a detector chip of a pixelated detector, the detector pixel circuit comprising:
an input node configured for being connected to a sensor pixel of a semiconductor substrate chip of the pixelated detector;
an integrator stage configured for receiving a sensor input via the input node and for integrating the received sensor input;
a first line interconnecting the input node and the integrator stage and a first switch disposed in the first line between the input node and the integrator stage, wherein a first grid node branches from the first line in between the first switch and the input node via a first grid switch,
a sample and hold, SH, stage configured for sampling and holding a voltage outputted by the integrator stage, wherein a second grid node branches from the SH stage via a second grid switch;
an output node configured for receiving a detector output from the SH stage.

8. Method for operating a pixelated detector selectively in one of a first operation mode and a second operation mode:
by, in the first operation mode, disconnecting the first conducting grids and the second conducting grids from the detector pixels,
by, in the second operation mode, connecting the first conducting grids of the first macropixels to the respective subsets of detector pixels, and
by, in the second operation mode, connecting the second conducting grids of the second macropixels to the respective subsets of first macropixels,
the pixelated sensor, comprising a semiconductor substrate chip with a plurality of sensor pixels and a detector chip with a plurality of detector pixels,
wherein each of the plurality of sensor pixels is configured as a photodiode and is electrically connected to an input node of one of the detector pixels,
wherein each of the detector pixels is configured to receive a sensor input from the connected sensor pixel, to convert the sensor input into a detector output and to output the detector output to an analog to digital converter, and
wherein the detector chip further comprises a plurality of first macropixels and a plurality of second macropixels, wherein each first macropixel is formed by subset of detector pixels switchably interconnected via a first conducting grid and wherein each second macropixel is formed by a subset of first macropixels switchably interconnected via a second conducting grid, wherein each of the detector pixels is configured for receiving the sensor input via a first line comprising a first switch, wherein the first conducting grid of each first macropixel is switchably connected to the first lines of the respective subset of detector pixels, and wherein each first line of the subset of detector pixels is connected to the first conducting grid in between the respective first switch and sensor pixel via a respective second switch.

9. Method according to claim 8 for operating a pixelated detector, wherein the plurality of first macropixels is formed by a plurality of subsets of detector pixels, each subset of detector pixels having their first lines switchably interconnected with a respective first conducting grid and wherein the plurality of second macropixels is formed by a plurality of subsets of first macropixels, each subset of first macropixels having the SH stages of their active detector pixels switchably interconnected with a second conducting grid, selectively in one of a first operation mode and a second operation mode:

by, in the first operation mode, setting conductive each of the first switches, disconnecting the at least one first conducting grid from the first lines and setting non-conductive each of the third switches disconnecting the at least one second conducting grid from the SH stages, by, in the second operation mode, forming the plurality of first macropixels by interconnecting the first lines of a first plurality of subsets of detector pixels with first conducting grids, respectively, and by setting one first switch of each of the first macropixels conductive and the other first switches non-conductive, thereby defining on active detector pixels per first macropixel each comprising one conductive first switch, and by, in the second operation mode, forming the plurality of second macropixels by connecting the SH stages of a plurality of second subsets of active detector pixels with second conducting grids, respectively, via a plurality of third switches during the hold phase of the connected SH stages.

10. Method according to claim 8, wherein the first operation mode is an imaging mode with an exposure time $T_1$, the second operation mode is a fast readout mode with an exposure time $T_2$ smaller than $T_1$, and wherein the at least one first macropixel is formed of up to $T_1/T_2$ detector pixels.

* * * * *